United States Patent [19]
Condrey

[11] Patent Number: 5,590,839
[45] Date of Patent: Jan. 7, 1997

[54] METHOD AND APPARATUS FOR DELIVERING COTTON MODULES AND COTTON THEREFROM INTO A COTTON GIN

[76] Inventor: Tommy H. Condrey, P.O. Box 592, 100 Star Arlington Dr., Lake Providence, La. 71254

[21] Appl. No.: 184,943

[22] Filed: Jan. 21, 1994

[51] Int. Cl.⁶ .......................... B02C 23/02; B02C 23/08
[52] U.S. Cl. ................... 241/27; 241/79.1; 241/186.35; 241/605
[58] Field of Search .............................. 241/27, 30, 605, 241/186.35, 79.1

[56] References Cited

U.S. PATENT DOCUMENTS

| | | | |
|---|---|---|---|
| 3,897,018 | 7/1975 | Wilkes et al. | 241/223 |
| 4,031,003 | 6/1977 | Husky | 241/186.35 X |
| 4,117,571 | 10/1978 | Prather | 19/64.5 |
| 4,202,079 | 5/1980 | Prather | 19/64.5 |
| 4,214,347 | 7/1980 | Prather | 19/64.5 |
| 5,017,076 | 5/1991 | Condrey | 414/345 |
| 5,209,413 | 5/1993 | Dwyer et al. | 241/101.7 |
| 5,222,675 | 6/1993 | Stover | 241/101.1 |
| 5,395,062 | 3/1995 | Von Gehlen et al. | 241/605 X |

FOREIGN PATENT DOCUMENTS 1158094  5/1985  U.S.S.R. .................. 241/605

Primary Examiner—John M. Husar
Attorney, Agent, or Firm—Hopkins & Thomas

[57] ABSTRACT

Carts successively installed in a transfer station, receives a cotton module from above and are successively transported by a tractor into a conveyor assembly which feeds the carts successively toward a stationary feeder head where the cotton of each module is removed progressively as the cart is passed under the feeder head fluffing the cotton and delivering it to a plenum chamber. An auger, which sweeps laterally over the empty portion of the cart forming a temporary bottom for the chamber delivers the fluffed cotton to an air box separator in which rocks and stones are removed by gravity and a suck pipe removes the fluffed cotton to convey it to the gin.

29 Claims, 9 Drawing Sheets

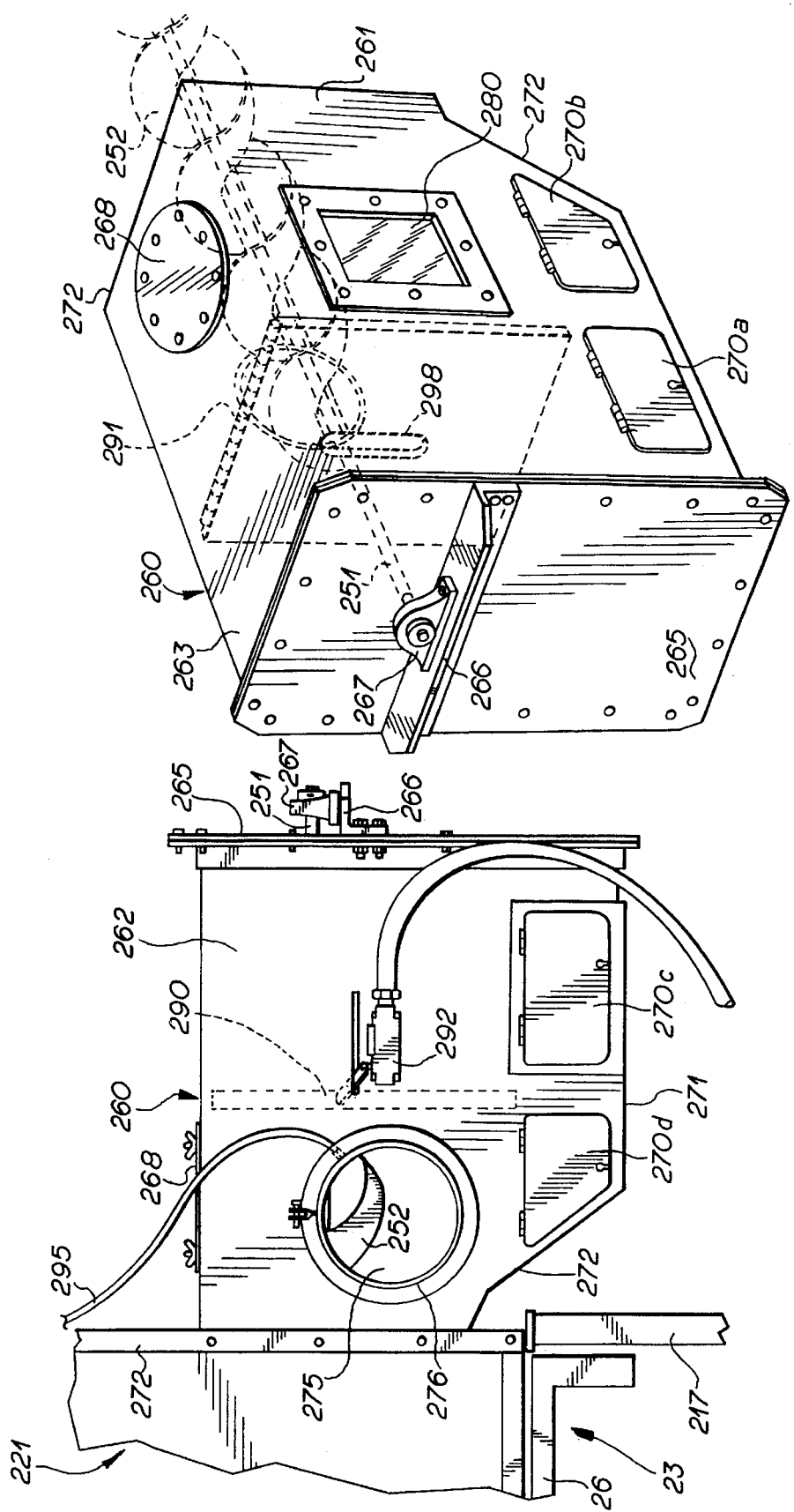

METHOD AND APPARATUS FOR DELIVERING COTTON MODULES AND COTTON THEREFROM INTO A COTTON GIN

FIELD OF INVENTION

This invention relates to a method and apparatus for delivering cotton modules and cotton therefrom to a cotton gin and more particularly concerned with a cotton module handling system having flat bed carts with rubber tires and a stationery cotton gin feeder which progressively fluffs and blends cotton from successive cotton modules being fed thereto.

BACKGROUND OF THE INVENTION

The season of cotton harvesting is a rather short one, occurring in the early Fall of each year. It is every farmer's goal to harvest as much cotton as possible before inclement weather prevents the harvesting and transportation of the cotton to a gin where it can be processed.

Presently, harvested cotton is compacted in the field into 32'×9' foot modules by special equipment known as module builders. The modules are then loaded onto a truck or tractor trailer having a movable bed to effectuate the loading and unloading of a module. The truck then transports the module to a gin where it is commonly stored in an open field usually situated about a high point and commonly called a module yard. The modules are unloaded from the truck and placed directly on the ground until the gin is ready for that particular module. While being stored in the module yard, the modules are exposed to the elements of nature causing portions of the modules to rot. Additionally, the bottom portion of the module is contaminated by the dirt and rocks upon which it rests.

When the gin is ready for the next module of cotton, a movable bed truck is sent to receive the module and transport it to the gin where it can be fed into the gin. This double-handling of cotton results in several undesirable effects. First, the modules tend to deform and lose their shape, the more they are handled, increasing the risk of the module breaking apart. Secondly, a portion of each module is left behind each time the module is loaded onto a truck having a movable bed. This results in a sizeable cumulative loss as easily discernable by the common sight of white patches on the ground in a module yard. Lastly, multiple loading and unloading of a module contributes to the knotting of cotton fibers by the chain beds of the truck which are believed to cause rib fires and gin stand problems.

As a practical matter, these inadequacies of the prior art cannot be solved by merely loading the movable bed trucks with modules when the cotton is harvested and leaving the modules on the trucks until the gin is ready for that module. This is because the cost of each truck would make it impractical to purchase the number of trucks necessary for the operation of the gin, not to mention the down time associated with breakdowns of the truck.

Compelled by these shortcomings in the industry, I invented and patented a system for handling cotton modules, disclosed in U.S. Pat. No. 5,017,076, issued May 21, 1991. The system is known in the market place as "MOD-TRACK", wherein the modules are stored on trailers which utilize a network of railway tracks. Associated with the railway track is a transfer station for receiving modules from movable bed trucks and delivering them successively onto carts for either storing or transporting to the gin. Because the cotton is stored on carts and does not touch the ground, and the module is not double handled, a high quality yield results with minimal amounts of cotton lost.

The system disclosed in my '076 patent does require the dedication of land on which railway tracks may be laid, and therefore, lacks flexibility. Moreover, a railway system potentially limits the storage capacity of a gin to that portion of the track covered by a roofing apparatus.

Even with the railway track system and carts described in the '076 patent for preserving the quality and yield of the harvested cotton up to the point where it is fed into the gin, the gin is not fed cotton at its maximum rate, and the desirable efficiency is lost. To date, feeders are not capable of feeding the gin fast enough to maximize the capacity of most gins.

Currently in use are movable feeder heads in conjunction with suck pipes. Essentially, the movable feeder head consist of a dome-like structure containing rotating cylinders each having a plurality of radial fingers which, when the feeder head is passed over a module, disperses the cotton which is then sucked by the suck pipe into the incoming separator of the gin. Typically a module is placed on a flat concrete surface and the movable feeder head progressively moves over the module sitting on the surface as the fingers of the rotating cylinders disperse the cotton from the modules by downwardly striking on the module with the fingers extending from each cylinder.

The inherent deficiencies of such suck pipe feeders are substantially the same as described above in regard to the movable feeder head. However, a movable feeder head only moves in one direction, thus requiring an interval of time so that the feeder head may be reloaded with another module and the contaminated cotton not fed into the gin is swept away. Thus, a marked amount of cotton harvested by the farmer is lost due to the inefficiency of the feeder and the double handling of the module.

The movable feeder head will also leave wet spots in the cotton clumped together as it is sent to the incoming separator. Along with the wet spots of cotton, there will be rocks, mud and debris gathered by the module while being stored in the module yard. To operate a movable feeder head requires approximately two to three workers. Alternatively, some gins utilize hydraulically controlled suck pipes which pass over an unloaded module, sucking off portions of the module as they pass over the module.

BRIEF DESCRIPTION OF THE INVENTION

Briefly described, the present invention includes a transportation station for unloading cotton modules from transport trucks onto flat bed carts supported by and riding on a plurality of rubber tires for delivery to a cotton feeder system having a stationery feeder head. In more detail, a transport truck with a movable bed, loaded with a cotton module, transports this module from the module builder, which is usually located in or near the field being harvested, to the cotton gin. Adjacent to the site of the gin, a transfer station is provided with a housing with a flat unloading deck or platform. The transport truck is driven up a ramp and positioned on the deck at the transfer station so that its unloading end is substantially on the same vertical plane as the end of the deck. The deck is above a concrete driveway, allowing a cart to be positioned substantially underneath the deck in the opening below the deck. The cart is steered into position by placing the tongue of the cart in a trench running longitudinally in a linear path along the concrete driveway. A tractor attached to the cart pushes the cart into position, thus removing the opportunity for human error in positioning the cart. The truck opens its hatch and extends its movable floor, expelling the module down the inclined movable floor onto the cart. The module contacts an upright bulkhead attached to the tractor as it is discharged over the flat bed of the cart. The force of the module against the bulkhead moves the tractor and the module in a direction away from the ramp, the weight of the module becoming a ballast on the cart so that the force of the moving module moves the cart. At such time when the entire module has been off-loaded onto the cart, the tractor will move the cart and module to either a storage area or to the conveyor assembly where the module is progressively fed toward a feeder head for processing. Consequently, the module stays off the ground so that it will not be contaminated by dirt, rocks or debris. Moreover, the cotton is not double handled which generates waste by leaving behind cotton each time the module is moved.

At the conveyor assembly, the carts are successively moved by a tractor into a position where the cart tongue is placed in a trench running in a linear path longitudinally along a second concrete driveway. The tongue will then steer the care into alignment with other carts as the cart is pushed by the tractor. At this stage, progressively narrowing guide rollers, positioned on one side of the pathway, receive the bottom of one side flange of the cart for guiding the cart. As the rollers guide the cart into alignment, along the pathway, troughs beneath the wheels of the cart also guide the wheels.

The cart then progresses into a second segment of the conveyor where the feed-in rollers are on both sides of the cart and a chain belt with outwardly extending lugs, engages a similar lug located on the underneath side of the cart for propelling the cart. The tractor then disengages automatically from the cart and is available to proceed for engaging and pushing the next cart at the transfer station.

The in-feed conveyor is motor driven and propels the cart to the next segment of the conveyor known as the "feeder conveyor" where like lugs on the conveyor chain engage the lugs on the cart for propelling it.

The feeder conveyor is motor driven by a second motor, capable of variable speeds. The speed of the cart is critical in that it is set at a rate so that the feeder head, which separates the cotton from the module, is being fed cotton at its maximum rate and without interruption. The conveyed cart, propelled by the feeder conveyor, actually pushes the cart in front of it, through the feeder head. Without the presence of the propulsion or a conveyed cart, the conveyor and the feeder head are shut off.

Idler rollers upon which the other side flange of the cart rests, positions the horizontal surface of the cart bed to a prescribed height for movement beneath the feeder head. Troughs are provided in the driveway so that a substantial portion of the weight of the cart is carried by the idler rollers while the tires remain in contact with the driveway.

The feeder head comprises a dome or housing encompassing a plurality of vertically spaced, transversely rotatable disposed shafts having parallel horizonal axes and radially protruding fingers extending therefrom. Behind the lowermost rotatable shaft is positioned a transverse auger, substantially horizontally parallel with the lowest rotatable shaft. The auger pushes the cotton into an air box separator where the debris in the cotton are separated and the cotton is them removed by air to the gin.

As the cart is being pushed into the feeder housing, the top rotating shaft is the first to contact the module, rotating upwardly against the module, so that the disbursed cotton is thrown upwardly and is sucked into a plenum chamber at the back of the feeder housing. The fingers on the shafts are divided into segments along the length of each shaft, the rows of fingers in each segment being 45° offset from the fingers in the adjacent segments. This distributes the load on the fingers while they are in contact with the module. Angle iron braces are utilized to form depth gauges to regulate the penetration of the fingers into the compressed cotton and act as holders for reinforcement of the fingers. Additionally, the fingers, adjacent the ends of each shaft, are bent outwardly to prevent the wrapping of cotton around the shafts, thus reducing the chances of fire in the feeder head.

The disbursed cotton is delivered to turbulent air in the plenum at the rear of the feeder housing and is thus fluffed and blended. This allows wet spots and contaminated cotton in the module to blend with the other cotton. The cotton is accumulated on the portion of the cart which temporarily forms a part of the bottom of the plenum chamber and is pushed to one side by an auger which progressively conveys the cotton into an air box separator located at the side of the feeder housing. In the air box separator, the cotton is separated from the contaminants, such as debris, rocks, steel or wood particles.

A suck pipe, connected to the conventional incoming separator of the gin, is attached to the air box separator. The vacuum created by the suck pipe in the air box separator is controlled by a plurality of slideably-mounted or hinged doors. By partially opening and closings these doors, the ginner can create the proper vacuum in the air box separator, such that the contaminants in the cotton stay in the air box separator and only the cotton is sucked into the suck pipe. The contaminants merely remain in the bottom of the air box separator until they are manually removed.

Thus, the progressively separated and conditioned cotton from the module is sent to the incoming separator of the gin, while the empty carts are progressively passed beneath the air box separator. When the cart is empty, a tractor will be attach to the tongue for taking it to the transfer station for loading with another module, so that the process can be repeated.

A feature of the system of the present invention is its ability to stop feeding modules to the feeder head upon the occurrence of specific events. Such events may be the malfunction of the gin, stopping the gin in process, a loss of vacuum in the suck pipe, a change in the owner's of the modules to be fed in or the absence of the propulsion cart for pushing the forwardmost cart through and beneath the feeder.

Accordingly, it is an object of the present invention to provide a system for handling cotton modules and feeding the cotton therefrom into a cotton gin which system is inexpensive to manufacture, durable in structure and efficient and reliable in operation.

Another object of the present invention to provide an apparatus and process for removing cotton from a module which will overcome the deficiencies and inadequacies of the prior art module handlers and feeders.

Another object of the present invention is to provide an apparatus and process for removing cotton from a module which provides substantially continuous flow of cotton to the gin.

Another object of the present invention to provide a process and apparatus which will remove the need for double handling of modules, reducing gin strand problems while maximizing the capacity of the gin.

Another object of the present invention is to provide an apparatus and process of delivering cotton to a gin so as to provide a continuous flow of cotton to the gin.

Another object of the present invention is provide an apparatus and process for supplying cotton to a gin so as to reduce the labor force necessary to handle the cotton modules and feeder.

Another object of the present invention is to provide an apparatus and process for delivering cotton to a gin which will blend the wet or contaminated portions of the module with other cotton.

Another object of the present invention is to provide an apparatus and process of delivering cotton to a gin so as to reduce the repair or maintenance cost associated with the module handlers and feeders.

Another object of the present invention is to provide an apparatus and process of delivering cotton to a gin so as to provide a feeder that can be cleaned without shutting it down.

Another object of the present invention is to provide an apparatus and process of delivering cotton to a gin so as to reduce the risk of fire associated with cotton being wrapped around the drive shafts.

Another object of the present invention is to provide an apparatus and process of delivering cotton to a gin so that an operator can readily detect a change in the modules fed to the feeder and permit a separation of cotton from one farmer before feeding cotton from another farmer.

Another object of the present invention is to provide a process for delivering cotton modules and cotton therefrom into a cotton gin efficiently and in a substantially continuous manner.

Another object of the present invention is to provide an apparatus for successively unloading and disposing modules of cotton from successive carts carrying the modules.

Another object of the present invention is to provide a feeder head for a cotton gin which is capable of successively unloading compressed modules carried by moveable carts and deliver the cotton therefrom in a fluffed and separated condition to the gin.

Another object of the present invention is to provide a system of handling successive modules of cotton and deliver the cotton of these modules successively to a cotton gin in an efficient and inexpensive way.

Another object of the present invention is to provide a process of delivering the cotton to a cotton gin in a manner which will reduce to a minimum the manual labor required.

Another object of the present invention is to provide a cotton gin feeder head assembly which is capable of automatically removing successive compressed cotton modules from carts and delivering the cotton in a separated condition in an efficient and facial manner.

Another object of the present invention is to provide a cotton gin feeder head assembly which will automatically shut down whenever there is an overload of cotton being fed to the cotton gin.

Another object of the present invention is to provide a system of handling cotton modules supplied to a cotton gin so that an uninterrupted supply of compacted cotton modules will be supplied to the feeder head and a substantially uninterrupted supply of fluffed cotton to the gin.

Other objects, features and advantages of the present invention will become apparent from the following description when considered in conjunction with the accompanying drawings wherein like characters of reference designate corresponding parts throughout the several views.

BRIEF DESCRIPTION OF THE DRAWINGS

FIG. 10A is a fragmentary rear elevational view of a portion of the feeder head assembly of the system shown in FIG. 1, and showing the air box separator; and FIG. 10B is a fragmentary perspective view of a portion of the apparatus shown in FIG. 1, and showing the air box separator depicted in FIG. 10A, and the baffle plate, and auger in broken lines.

DETAILED DESCRIPTION OF THE PREFERRED EMBODIMENT

Figure 1:
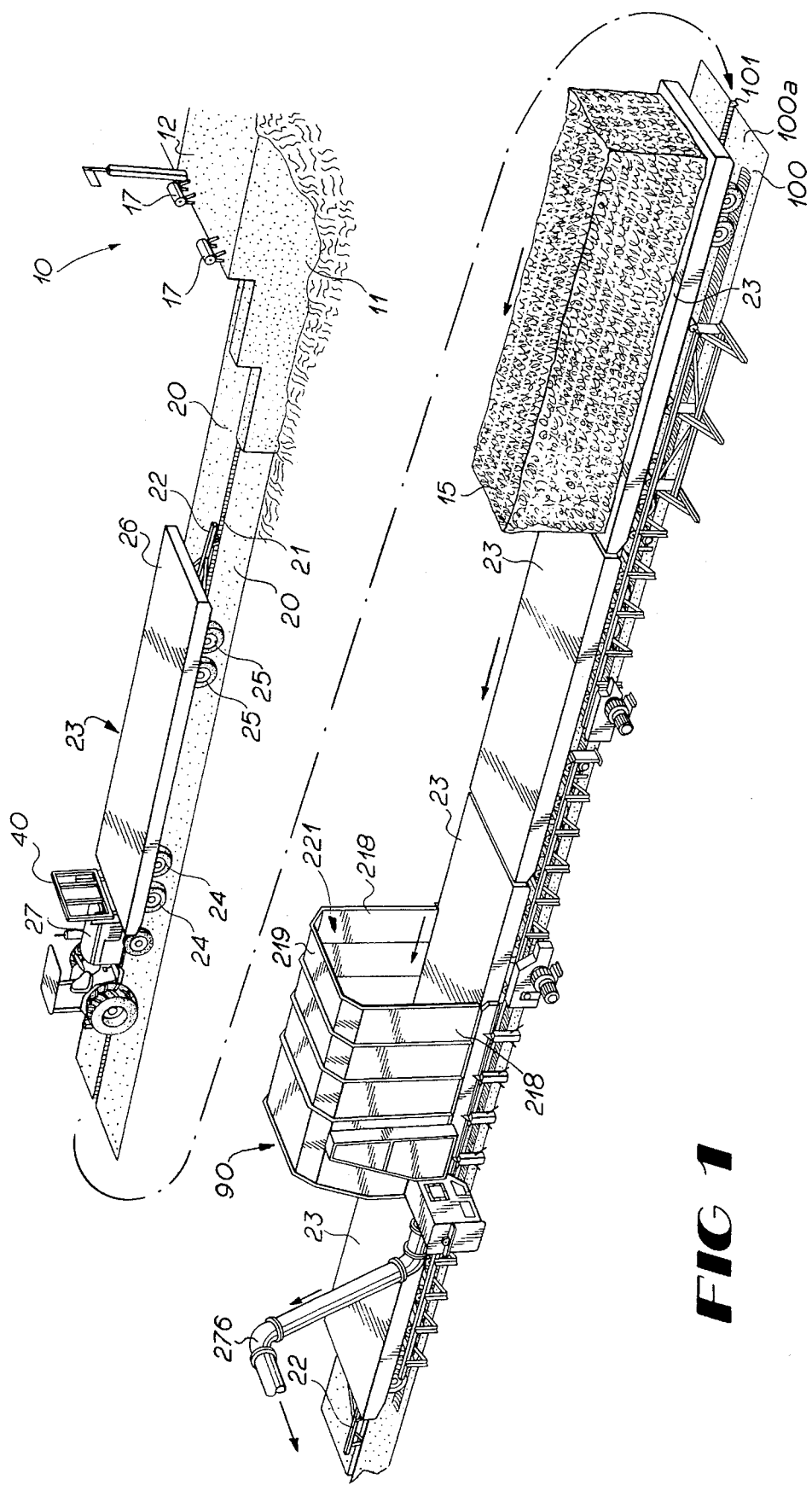
FIG. 1 is a schematic perspective view of a system for delivering cotton modules to a cotton gin and removing cotton therefrom, constructed in accordance with the preferred embodiment of the present invention.

Referring now in detail to the embodiment chosen for purposes of illustrating the present invention, numeral 10 denotes, generally, a housing or transfer station at which the cotton module 15 is transferred to a cart 23. Housing 10 includes upstanding side walls, such as wall 11, and a flat horizontal deck 12 on which a truck or tractor trailer T which contains a cotton module 15, in FIG. 2, can be off-loaded. A movable floor conveyor, such as conveyor 16, either in the truck or mounted on the deck 12 provides an upper flight which is capable of moving the module 15 from left to right in FIG. 2. Therefore, when a truck is positioned on the deck 12, the module 15 which it contains can be progressively off-loaded from left to right in FIG. 2.

A pair of stops 17 prevent the truck from being backed up sufficiently that its rear wheels fall off of the deck 12. The housing 10 has a hollow interior open at one end and there is a straight flat concrete roadway or driveway 20 which leads into the housing 10. This roadway 20 has a straight or linear central trench or trough 21 extending the full length of the roadway 20 and into the hollow interior of housing 10.

This trench 21 forms a guide for the tongue guide 22a of a cart, denoted, generally, by the numeral 23.

Figure 6:
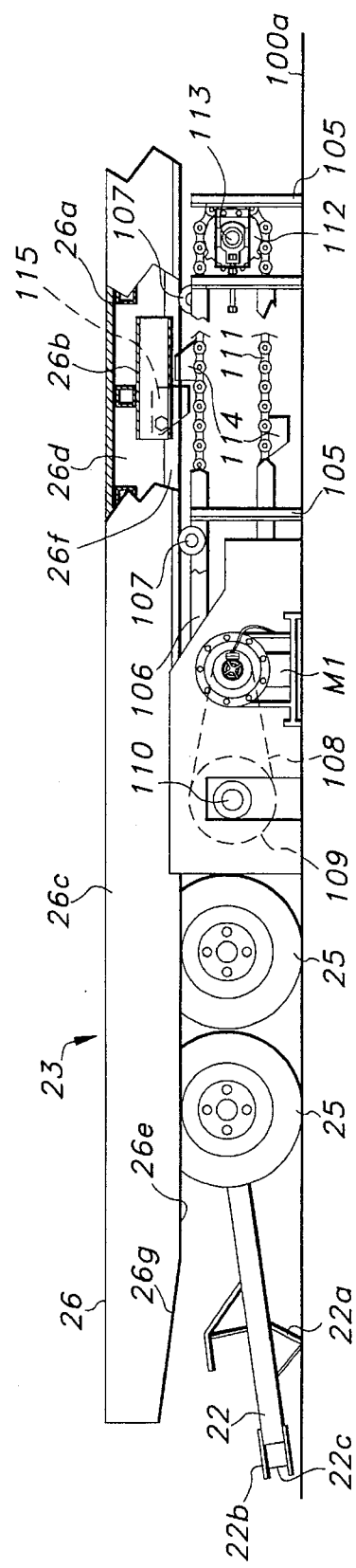
FIG. 6 is a fragmentary side elevational view of a portion of the conveyor system shown in FIG. 5, and showing the chain lugs and cart lug for propelling the cart.

This cart 23 has a flat rectangular bed or platform 26 which is supported in a horizontal position by a plurality of rear wheels 24 and a plurality of front wheels 25. The front wheels 25 are steerable by the tongue 22, the tongue 22 protruding forwardly beyond the front end of the cart 23. As best seen in FIG. 6, the tongue guide 22a is a downwardly protruding V-shaped member, the lower end portion of which is adapted to be received in the trough or trench 21.

The flat rectangular bed 26 is supported by a plurality of equally spaced transversely extending ribs 26a which are, in turn, supported on longitudinal beams 26b, carried by the wheels 24 and 25. Depending from the side edges of the deck or bed 26 are a pair of opposed, complimentary, downwardly protruding longitudinal side flanges 26c and 26d. Their lower edge portions 26e and 26f are straight parallel lower surfaces, the front end portions of which are inclined upwardly and forwardly as at numeral 26g.

The cart 23 is adapted to be pulled or pushed, selectively, by the tractor 27. When an empty cart 23 is delivered to the driveway 20, the tractor 27 pulls the cart 23 by its tongue 22 so that it is positioned in about the position shown in FIG. 1 and then releases the tongue 22 so that the tongue guide 22a is received in the trough 21. Thereafter, the tractor 27 moves around to the backside of the cart 23 and pushes the cart 23 forwardly until only a rearmost portion of the cart 23 protrudes from beneath the deck 12. The tongue guide 22a riding within the trough 21 guides the cart 23 as it moves into position in the housing 10.

Figure 2:
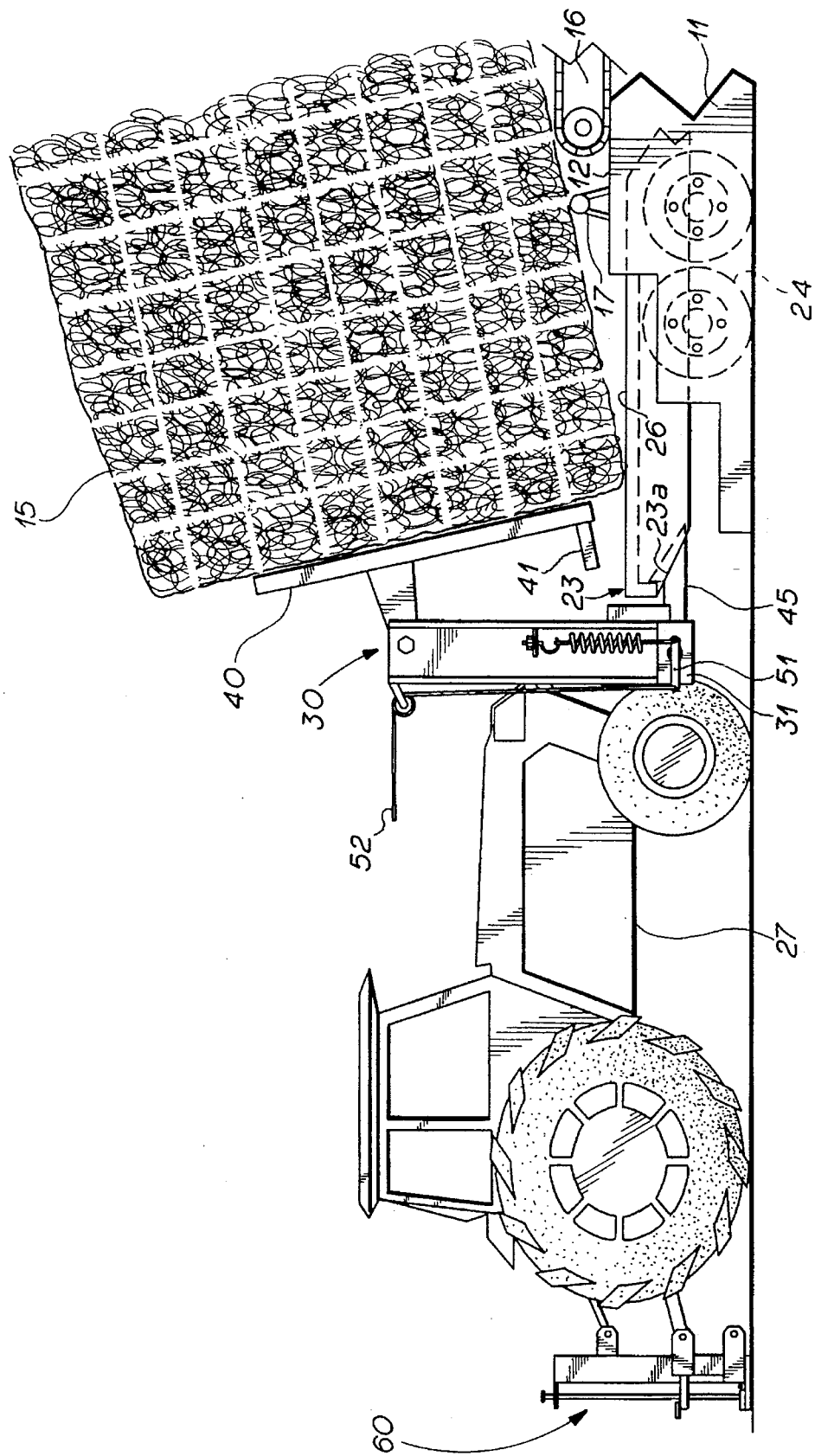
FIG. 2 is a fragmentary side elevational view of a portion of the transfer station of the system shown in FIG. 1 and showing a module being unloaded onto a cart thereof.
Figure 3:
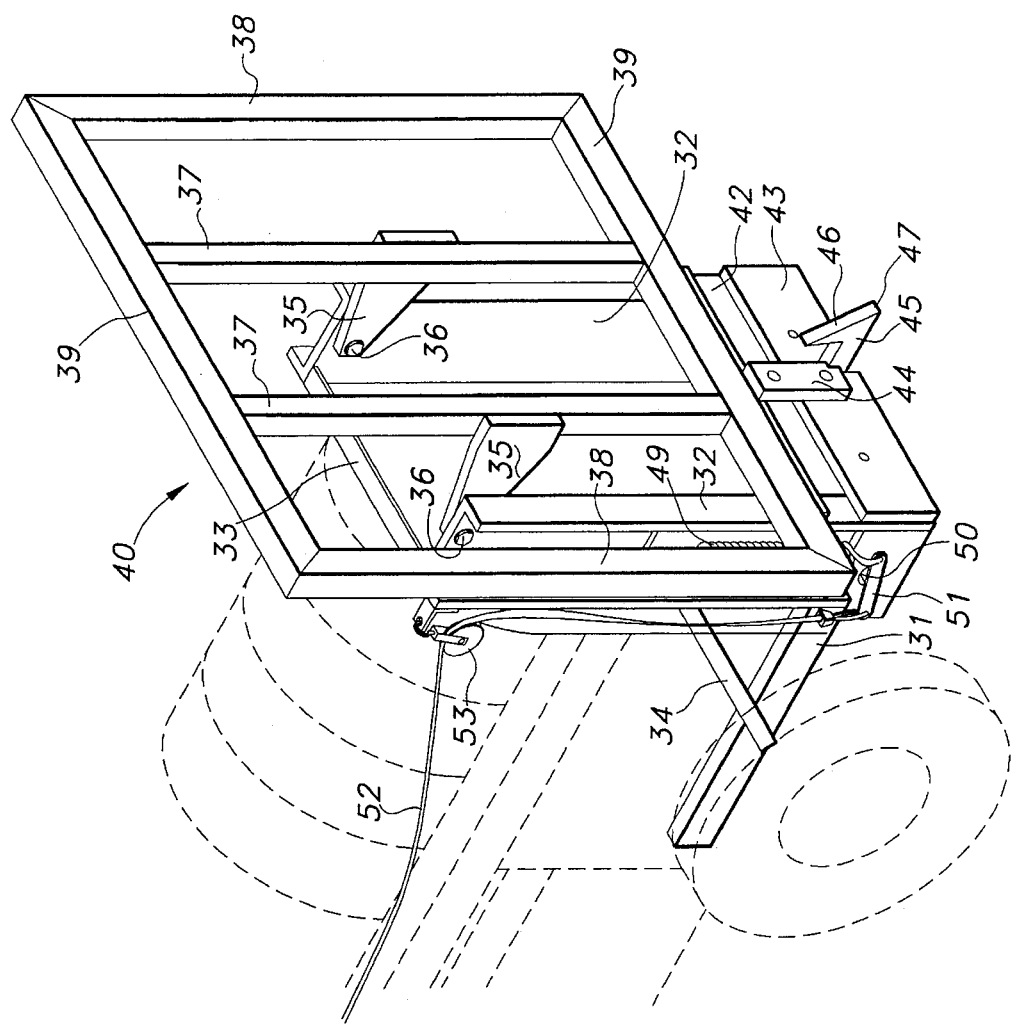
FIG. 3 is a perspective view of a bulkhead stop attachment for the tractor shown in FIGS. 1 and 2.

As best seen in FIGS. 2 and 3, the front end portion of the tractor 27 is provided with a stop frame, denoted generally by numeral 30. This stop frame 30 includes a pair of opposed, essentially parallel, beams 31 which are mounted to opposite sides of the tractor 27 and protrude forwardly beyond the front end of the tractor 27. The front end portions of the beams 31 respectively support a pair of opposed upright channel members 32, the end portions of which are connected by cross bars, such as cross bar 33. Braces 34, extending between the central portion of the beams 31 and the central portion of the channel members 32, support the channel members 32 in their upright positions.

A pair of pivot arms 35 are mounted by pivot pins 36 to the upper end portions of channel members 32. These pivot arms 35 protrude forwardly and their distal ends are respectively connected to the central portions of a pair of upstanding struts 37 which form a part of an abutment frame 40. In more detail, the abutment frame 40 is an open rectangular frame having side bars 38 which are respectively outwardly adjacent to and parallel to the struts 37. The upper and lower ends of the rectangular or square frame 40 are formed by end bars 39 which join the upper and lower ends, respectively, of the side bars 38. Thus, the frame 40 is adapted to be pivoted from a vertical position as shown in FIG. 3 to an inclined position as shown in FIG. 2, so as to form a stop to receive the end of the module 15. A bumper 41 at the lower end of the frame 40 arrests the movement of the frame 40 when it is returned to its upright position.

Below the frame 40 and mounted on the lower end portions of the channel members 32, are a pair of cross bars 42 and 43 connected together by a central strap 44. A vertically movable latching lug 45 protrudes through a downwardly opening slot in the cross bar 43, the latching lug 45 having an upwardly and rearwardly inclined forward camming surface 46 which forms a part of the upstanding hook or bill 47 of lug 45. The latching lug 45 is spring loaded to the position shown in FIG. 3 but will yieldably move downwardly to pass under the rear end portion of the cart 23 and latch in place as shown in FIG. 2.

A camming rod 50, seen in FIG. 3 supports the latching lug 45 in its normal position as shown in FIGS. 2 and 3 and this camming rod 50 is provided with a lever 51 which is spring loaded by spring 49 to its position supporting the latching lug 45 in its latching position. Connected to the lever 51 is a cable or line 52 which passes over a pulley 53 and thence, rearwardly to the operator of the tractor 27. When the operator of the tractor 27 pulls the cable or line 52, it, in turn, rotates the lever 51 so as to cause the latch lug 45 to be pushed downwardly so as to disengage the end portion 23a of the cart 23.

Figure 4:
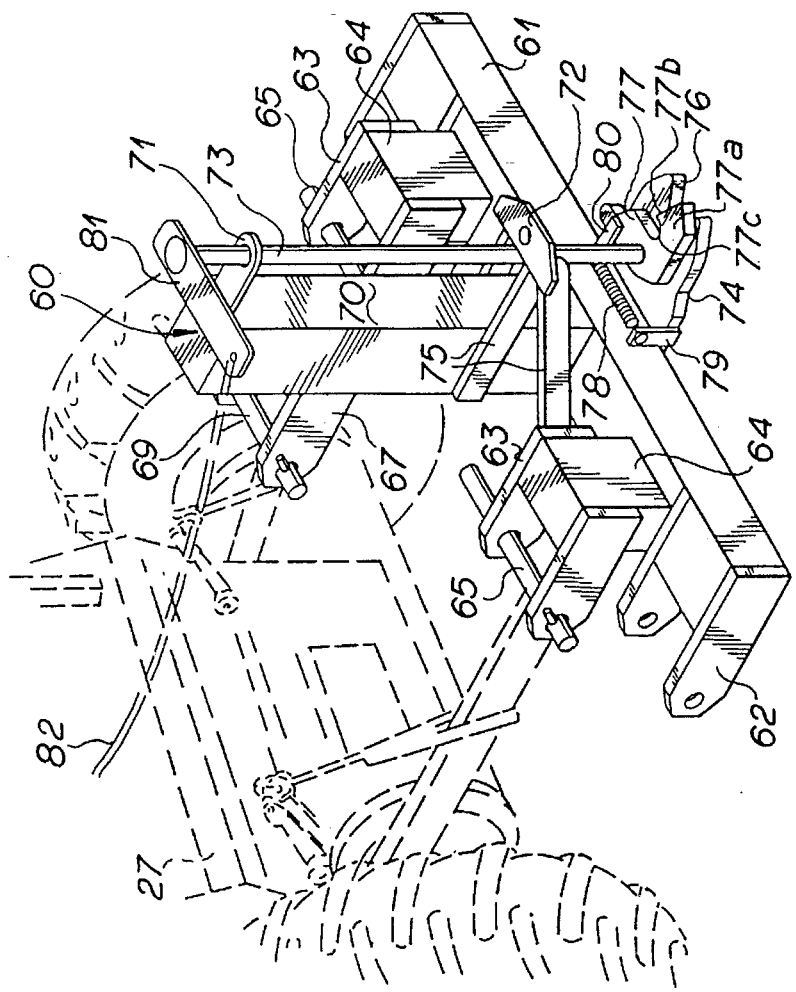
FIG. 4 is a perspective view of the automatic latching hitch attached to for the tractor shown in FIGS. 1 and 2.

As best seen in FIG. 4, the rear portion of the tractor 27 is provided with a tongue engaging assembly 60 which is adapted to engage the coupling 22b at the end of tongue 22 so as to tow it. In more detail, the tongue engaging assembly 60 includes a transversely disposed tow bar 61 having forwardly extending lower hitch engaging lugs 62 and upper hitch engaging lugs 63, the upper hitch engaging lugs 63 being mounted on support blocks 64 which protrude upwardly from the tow bar 61. It will be understood by those skilled in the art that by passing latch pins 65 through the lugs 63, the assembly 60 can be mounted on the side hitches of the tractor 27. There are also a top pair of lugs 67 on central upstanding bar 70, with their pin 68 for engaging the top hitch (not shown) of the tractor 27. Thus, this assembly 60 can be moved upwardly or downwardly in an arcuate path. The lower lugs, such as lugs 62 are for the larger tractors.

The upstanding bar 70 has a rearwardly extending upper plate 71. This upper plate 71 journals the upper end portion of a vertically disposed shaft 73, the lower portion of which is journaled by a stationery rearwardly protruding bifurcated latch element 74 which also functions as a thrust bearing for the lower end portion of the shaft 73. A guard plate 72 supported by brackets 75 prevent the shaft 73 from being inadvertently bent.

The latch element 74 is a flat plate, the forward end of which has a pair of rearwardly protruding fingers which taper rearwardly, thus defining a pair of opposed guide surfaces, such as guide surface 76. These guide surfaces 76 converge forwardly forming a throat which receives a vertical bale 22c on coupling 22b of tongue 22.

Above the latch element 74 is an L-shaped spring loaded latch 77. The shaft 73 passes through the apex of the L-shaped latch 77 and rotates the latch 77 when the shaft 73 is rotated. The latch 77 has a rearwardly extending arm 77a which tapers to a point so as to provide an inner camming surface 77b against which the bale 22c of the tongue 22 rides when the tractor is moved rearwardly to engage the cart 23.

Inwardly of the camming surface 77b, the latch is provided with a bale 22c engaging surface 77c which is adapted to pass behind and hold the bale when the cart 23 is to be towed. A spring 78 mounted on a brace 79 of a lever arm 80 of latch 77, urges latch 77 to a closed position in which the bale 22c is latched. This latching is accomplished as the tractor moves rearwardly for engaging the bale 22c, the bale 22c passing between the surfaces 77b and 76 causing the latch 77 to be rotated in a clockwise direction as viewed in FIG. 4 and then spring back into its normal position as shown in FIG. 4.

A disengaging lever 81 is mounted on the upper end portion of the shaft 73 and is provided with a lanyard or line 82 by which the lever 81 may be rotated in a clockwise direction so as to release the bale 22c whenever the lanyard 82 is pulled by the operator of the tractor.

When a bale 15 is to be off-loaded from a truck or van, the truck or van T, seen in FIG. 2, is backed into position and its ramp or moving floor 16 lowered so as to incline toward the cart 23 and guide the module 15 downwardly and toward the tractor and against the stop or abutment frame 40. The truck T can then back up slowly so as to push the module 15, the tractor 27 and the cart 23 away from the housing 10. When a portion of the module 15 is received on the deck 26, the tractor 27 may move away from housing 10, thereby carrying the module 15 so that it progressively is off-loaded onto the cart 23. In such a procedure, the abutment frame 40 is initially disposed in an angular position as shown in FIG. 2, and as the module 15 is received on the deck 26, the end of the module 15 will pivot the abutment frame 40 to a vertical position. The tractor 27 can then be placed in reverse so that it pulls the cart 23 away from the housing 10, the latch 45 remaining in its up position, as shown in FIG. 2, so as to remain engaged with the cart 23.

When the tractor 27 has removed the cart 23, the operator pulls the line 52 so as to release the latch 45 and then backs away from the cart 23 and returns to the front end of the cart 23 where the tongue is manually lifted out of the trough and attached no the latch 77. The tractor 27 can then transport the cart 23 to a waiting zone or directly to the in-feed conveyor section 80.

In the in-feed conveyor section 80 of the system is a straight flat rectangular elongated driveway 100 which is provided with a central longitudinally extending linear trench or trough 101 for guiding the tongue 22 of the cart 23 toward and through the feeder head assembly of the system. There is also an inner wheel trough 102 which is parallel to the central trough 101, throughout substantially the length of the driveway 100. This second trough 102 is to receive the wheels 24 and 25 of the cart 23 so as to lower one side of the cart 23 after the cart 23 is on the driveway 100. Extending from a mid-portion or intermediate portion of the driveway 100 and terminating inwardly of the exit end 100b of the driveway 100 is a third trough 103, the wheel trough 103 being parallel to trough 101 and 102 for receiving the wheels 24 and 25 on the other side of the cart 23.

Figure 5:
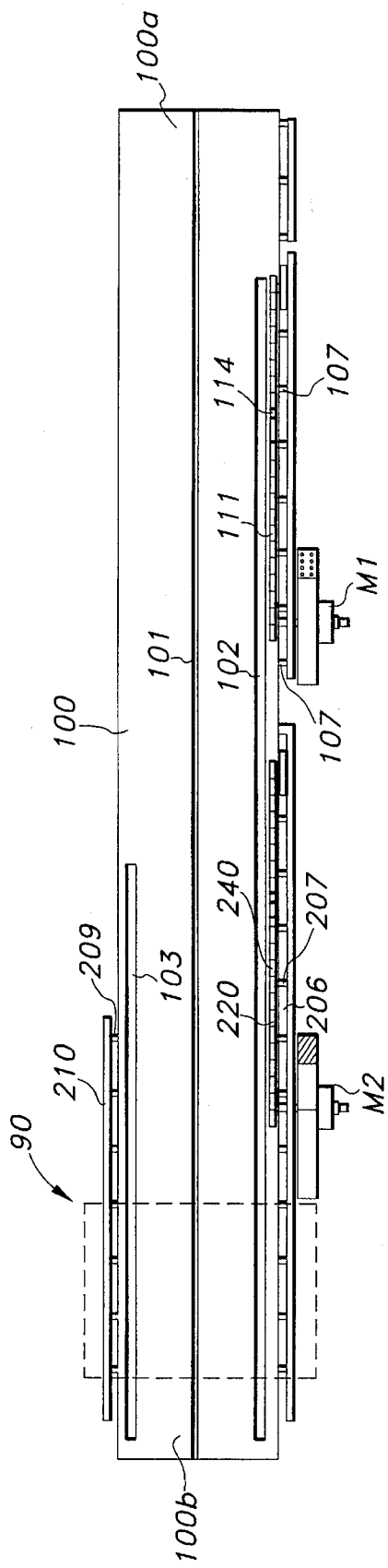
FIG. 5 is a top plan view of the conveyor feeder head assembly and driveway showing only the portions of the conveyor system for the feeder head assembly for the system shown in FIG. 1.

Outwardly adjacent to the left hand side of the driveway 100 are a plurality of longitudinally aligned, spaced uprights 105, which support a longitudinally extending channel member 106, seen best in FIG. 5. This channel member 106, in turn, supports a plurality of longitudinally spaced rollers 107 which are progressively more narrow and are adapted to receive the left-hand flange 26c of the cart 23 so that as the cart 23 is moved inwardly along driveway 100, with its guide 22a received in trough 101, the cart 23 will be aligned properly for its further travel inwardly along driveway 100. Thus, the first section of the in-feed conveyors section 80 functions for aligning each cart 23 appropriately for being fed toward the feeder head assembly.

For providing power to feed the carts 23 along the driveway 100, a motor M1, seen in FIG. 6 is provided. Motor M1 drives a continuous belt 108 which drives a sheave 109 for rotating shaft 110. Shaft 110, in turn, drives a sprocket (not shown) around which passes a continuous chain 111 which, in turn, passes around an idler sprocket 112 on shaft 113 supported between adjacent uprights 105. The chain 111 has spaced outwardly extending lugs 114 which are for the purpose of propelling the cart 23 when its flange 26c is riding on the rollers 107. The outwardly protruding lugs 114 of the upper flight of chain 111 are adapted to engage downwardly protruding lugs, such as lug 115, carried by beam 26b of each cart 23. Thus, when motor M1 is rotated, and a cart 23 is delivered to the conveyor section 80, and moved inwardly along the driveway 100, a lug 114 will engage lug 115 and thereby urge the cart 23 in an inwardly direction.

As the cart 23 is moved inwardly by the conveyor chain 111, its wheels 24 and 25 will be received in the trough 102 and hence, assure that the flange 26c remains in the rollers 107 and that the cart 23 is in appropriate alignment. From the first conveyor section, the carts 23 move to a second conveyor section where a conveyor chain 120 driven by a variable speed motor M2 conveys the successive carts 23 at a critical speed so as to feed a module 15 into the feeder head 225 as will be explained. As a cart 23 enters this second conveyor section, being pushed by cart a 23 from the first conveyor section, the lugs 214, which are identical to lugs 114, engage the lug 115 (seen in FIG. 6) of the cart 23 and conveys it along its path of travel toward the exit end 100b. At this stage, the left wheels 24 and 25 ride in the trough 102 and the left rollers 207, supported on a horizontal rail 206, carries a substantial part of the load of the cart 23. As the cart 23 is fed inwardly by the chain 220, the right hand flange 26d of the cart 23 rides upon a plurality of idler rollers 209 supported by a horizontal rail 210. When the cart 23 is supported by the rollers 209, the wheels 24 and 25 on the right hand side of the cart 23 are received in the trough 103 and hence, the deck 26 is supported in a prescribed horizontal plane as it continues its travel toward the exit end 100b. The cart 23 then enters the feeder head assembly or section 90 of the system. At this stage, the foremost cart 23 is no longer propelled by the lug 240 of the conveyor chain 220 and if it is the only cart 23 in place on the driveway 100, then the cart 23 will not be propelled further into the feeder head section 90. There will usually, however, be several carts 23 arranged in tandem so that the second cart 23, which is then being propelled by the conveyor chain 220, will push the forwardmost cart 23 into and through a major portion of the feeder head section or assembly 90.

Figure 7:
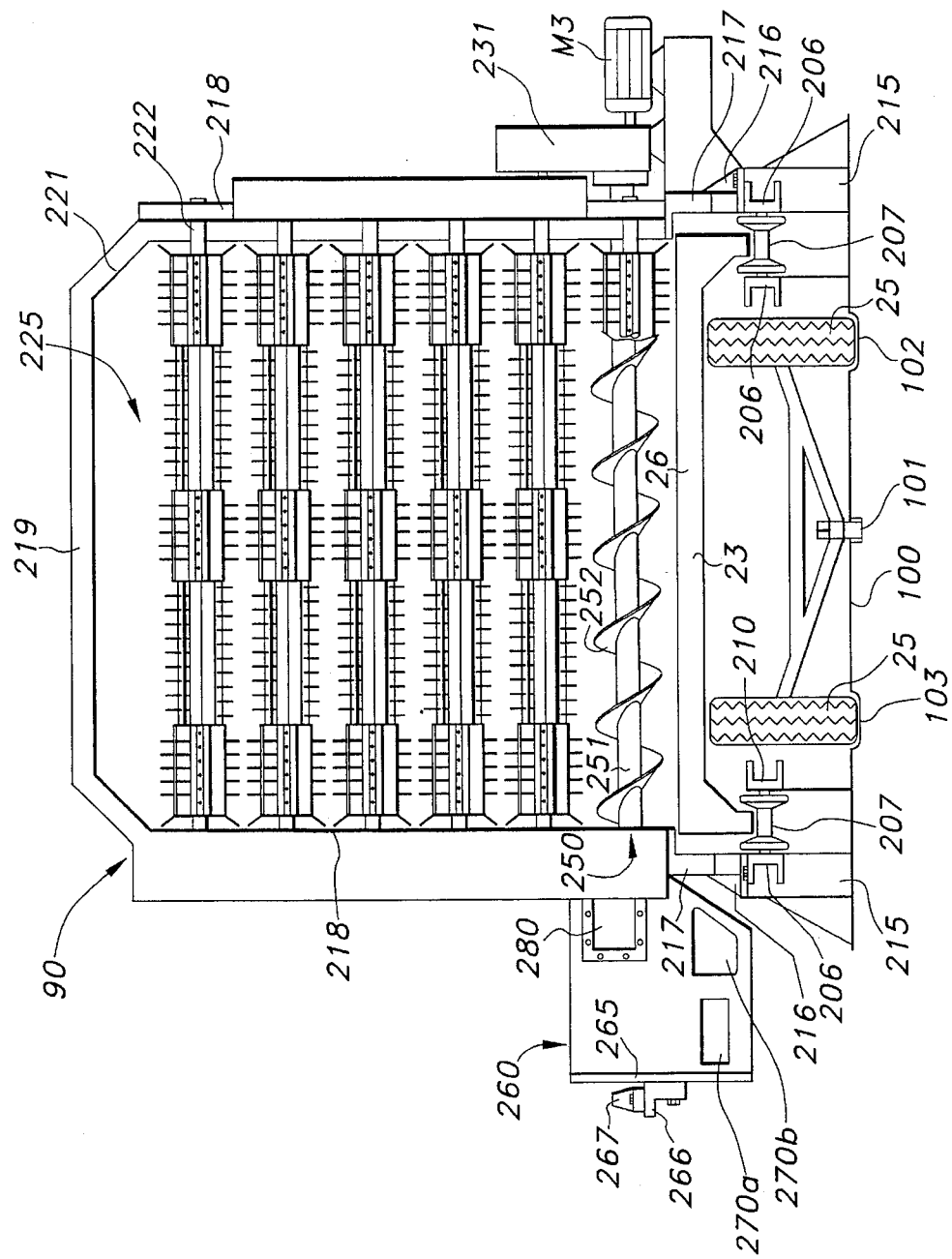
FIG. 7 is an enlarged front elevational view of a portion of the feeder head assembly of FIG. 1, and having portions removed so as to reveal the auger.
Figure 9:
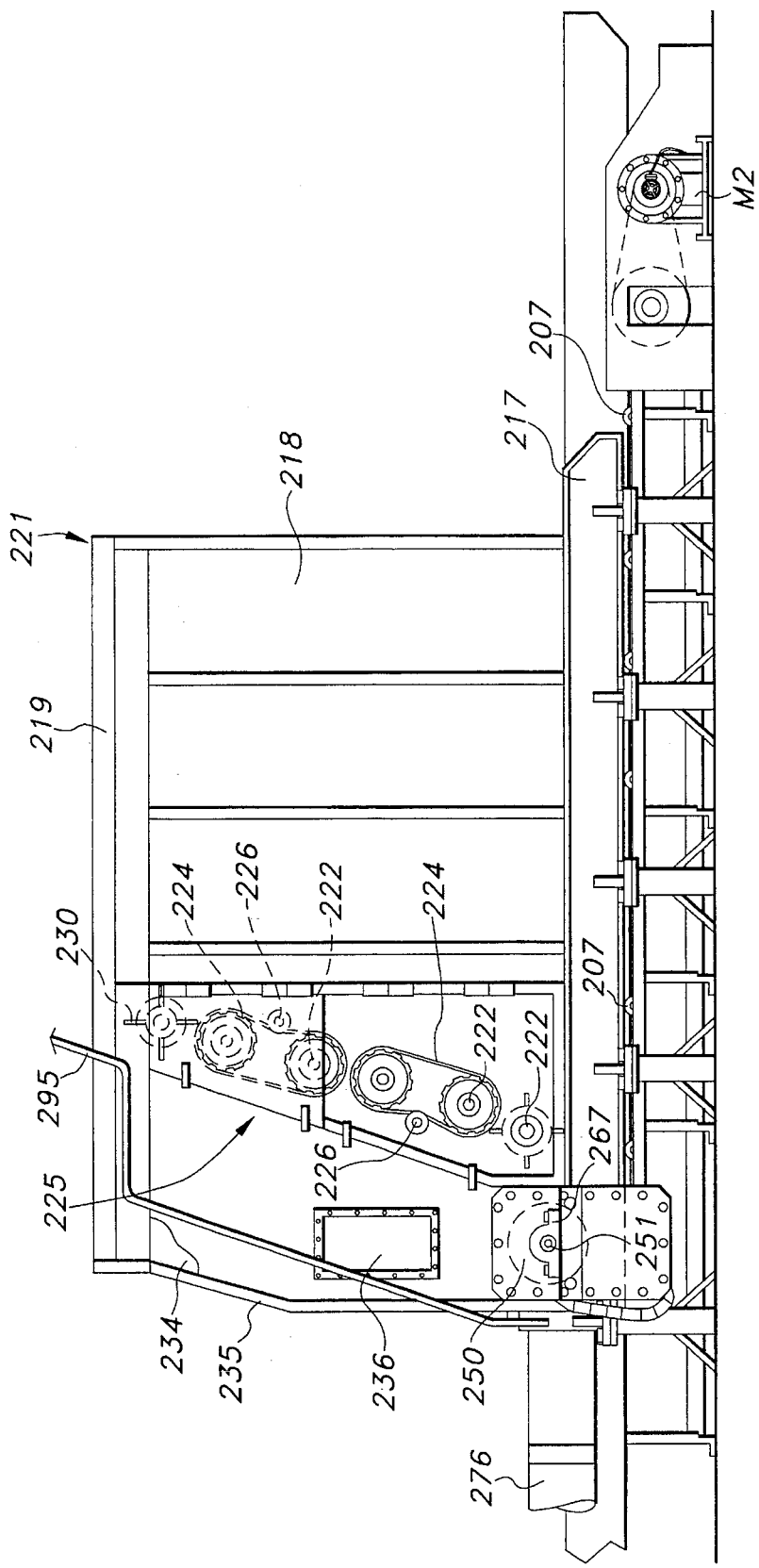
FIG. 9 is a fragmentary side elevational view of a portion of the feeder head assembly of the apparatus shown in FIG. 1.

Referring now specifically to the feeder head section or assembly 90, seen best in FIGS. 7 and 9, the channel menders 206 which support the rollers 207 are supported in their horizontal positions, extending longitudinally on opposite sides of tile driveway 100, by upstanding stanchions 215. Upstanding brackets 216 which, in turn, support opposed parallel beams 217. Opposed upstanding walls 218 are mounted on these beams 217 and the upstanding walls 218, in turn, support a transversely extending roof 219. The walls 218 and the roof 219 form a feeder dome or housing, denoted generally by numeral 221, which is open on its upstream end for receiving the carts 23 and their modules 15, the cart 23 passing beneath the inwardly turned flanges of the beams 217, as illustrated in FIG. 7. Thus, each cart 23 delivers its module 15 into the housing 221, being pushed by its preceding cart 23.

At the rear portion of the housing 221, is the feeder head, denoted generally by numeral 225. The function of the feeder head 225 is to progressively engage the modules 15 as they are carried by their respective carts 23, in the travel of the cart 23, in its downstream path beneath the housing 221.

Figure 8:
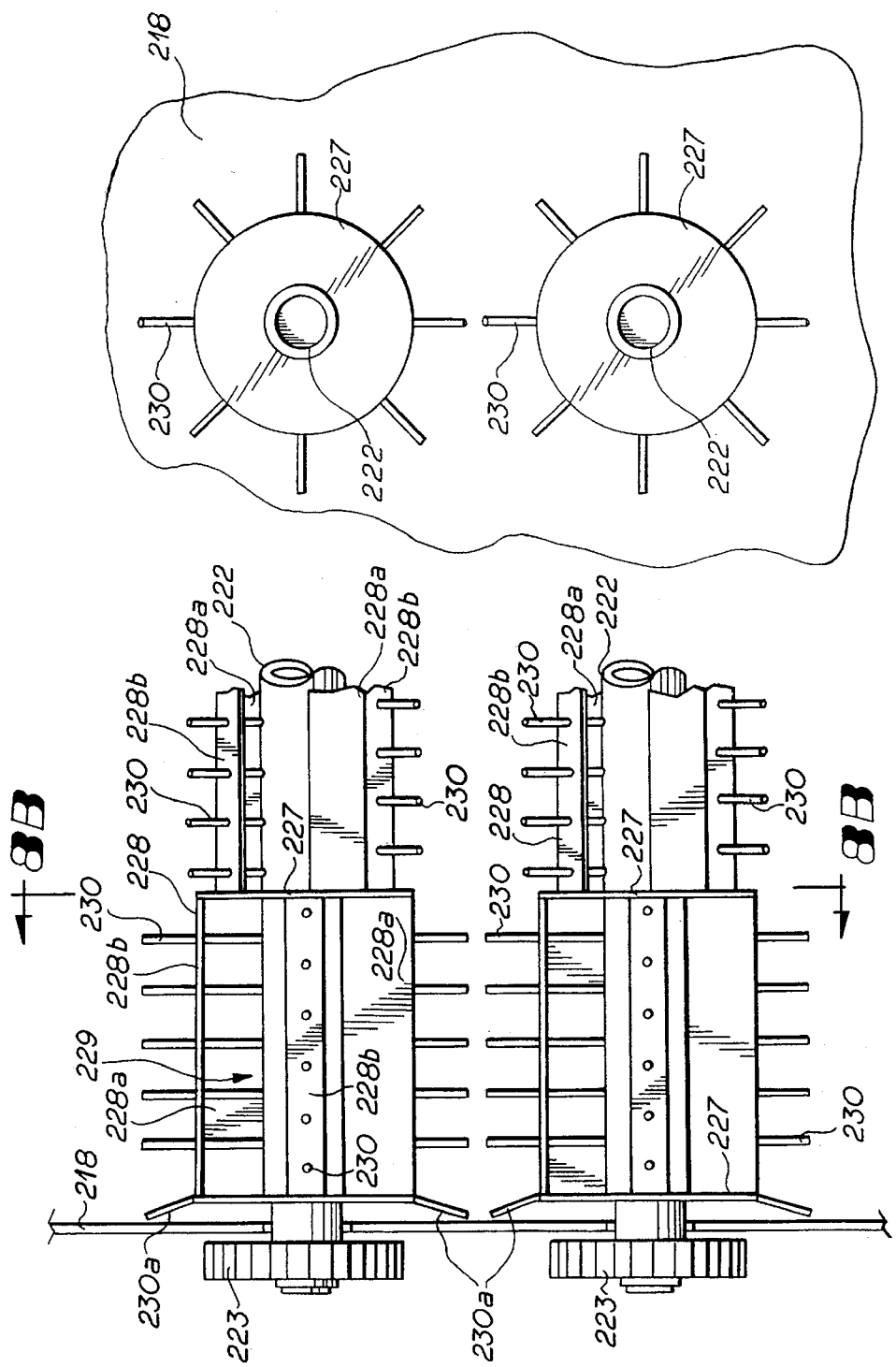
FIG. 8A is an enlarged fragmentary front elevational view a portion of the feeder head depicted in FIG. 7.
FIG. 8B is a vertical sectional view taken substantially along line 8B–8B in FIG. 8A.

Referring specifically to the feeder head 225, this feeder head includes a plurality of transversely extending equally, vertically, spaced shafts 222 which are journaled by their end portions in the opposed walls 218. As best seen in FIGS. 8a and 8b, each shaft 222 is preferably a hollow tubular cylindrical member which is provided at both of its end portions with sprockets, such as sprocket 223, outwardly of the walls 218. Adjacent pairs of sprockets 223 are connected together by timing belts, such as belts 224, tensions by idler pulleys 226. Thus, all shafts 222 are rotated in the same direction and at the same speed in synchronization with each other.

Axially spaced along each shaft 222 are a plurality of annular spacer plates 227. These spacer plates 227 are concentrically mounted on each shaft 222. Extending radially between adjacent pairs of spacer plates 227 are a plurality of circumferentially 90° spaced angle irons braces 228, each angle iron brace 228 having a flange 228a which extends generally radially away from the shaft 222 and a flange 228b which is spaced from the shaft 222 and is provided with a plurality of holes (not shown). The edge 229 of flange 228a is welded to the shaft 222. A plurality of outwardly protruding rigid metal rods or fingers 230 protrude radially outwardly from the periphery of each shaft 222. These fingers 230 extend through the holes in flanges 228b and outwardly beyond the flange 228b so that the fingers 230 exteriorly of flange 228b engage and dig into the side of the module 15 as the module 15 is fed toward the feeder head 225. The flange 228b serves a double function of reinforcing the fingers 230 and acting as depth gauges to limit the penetration of the fingers 230 into the cotton of module 15.

The fingers 230 are arranged in axially aligned rows spaced 90° circumferentially from each other, there being even and odd fingers so that the fingers of each segment between adjacent partitions 227, are staggered with respect to each other. Furthermore, the fingers 230 of adjacent rows which are separated by a partition 227 are circumferentially staggered with respect to the adjacent fingers by about 45°. Thus, a group or row of fingers 230 of one segment will strike the cotton 45° out of phase with the fingers 230 of an adjacent row. The outer fingers 230a are angled outwardly and are mounted on the periphery of the outermost partitions 227 as seen in FIG. 8a.

Motor M3 drives through a geared train 231, the lowermost shaft 222 and hence, all of the shafts 222 are rotated in a counter-clockwise direction as viewed in FIG. 9, so that the fingers tend to toss the cotton upwardly and inwardly into to a plenum chamber 234, defined by a back wall 235 of housing 221 and portions of the side walls 218. A bottom portion of bed 26 of cart 23 forms the temporary bottom of the plenum chamber 234. The accumulation of the cotton in the plenum chamber 234 can be viewed through a window 236 in wall 218.

As seen in FIG. 9, the shafts 222 are arranged at an incline, so that the uppermost shaft 222 is forwardly of the lowermost shaft 222 so that all shafts 222 are in a common inclined plane with respect to the path of travel of the module 15. Thus, the fingers 230 of the uppermost shaft 222 first engages the end of the module 15 as the module 15 is initially fed inwardly into housing 221.

Disposed at the bottom portion of the plenum chamber 234 is a transversely disposed conveyor auger 250 seen in FIG. 7. This auger 250 has a central shaft 251 and a helical blade 252. Shaft 251 is driven by a separate variable speed motor (not shown).

Outwardly of the plenum chamber 234 on one side thereof, is an air box separator 260 own in FIGS. 7, 10a and 10b. This air box separator 260 is a generally a cubical shaped member having side walls 261 and 262, a top 263 and a removable end plate 265. A bracket 266 on the end plate 265 supports a pillar block 267 which, in turn, journals the end of the shaft 251. At the top 263 in an access plate 268. Along the bottom portion of wall 261 is a slidable or hinged front door 270a and a rear door 270b. Similarly, side wall 262 has a front door 270c and a back door 270d.

The air box separator 260 has an open rectangular inner end which communicates with the plenum chamber 234 through the wall 218 so that a portion of the auger blade 252 protrudes into the air box separator 260. The air box separator 260 is also provided with an inclined panel 272 which forms a chute of the housing 221 leading from the plenum chamber 234 to the edge of the horizontal bottom 271.

Thus, when the cotton is removed from the bale 15 by the fingers 230, the cotton is accumulated in the plenum chamber on top of the bed 26 and is swept sidewise by the auger 250 into the air box separator 260. A window 280, seen in FIG. 10b, is provided so that the accumulation of the cotton in the air box separator 260 can be observed. The side 262 of the air box separator 260 is provided with an discharge port 275 which communicates with the suck pipe 276 leading to the gin.

Disposed with the central interior of the air box separator 260 is a swingable curtain or rubber movable baffle 290 denoted in broken lines in FIGS. 10a and 10b. This baffle 290 is hingedly suspended by a piano hinge 291 from the top 263 and, therefore, is free to swing back and forth. The shaft 251 of the auger 250 protrudes through an appropriate slot 298 in the central portion of the baffle 291. The function of this baffle is to detect a drop in the vacuum drawn on the air box separator 260, detecting an equalization of the air pressure and thereby indicating that the suck pipe 276 has been clogged up by cotton. A microswitch 292 mounted on the side 262, detects the position of the baffle 290 and will signal the shut down of motors M1, M2, M3 and the motor for auger 250. An air tube 295 also functions to detect a lack of a vacuum in the suck pipe 276. It too will provide a signal for the shut down of motors M1, M2, M3 and the motor for auger 250. The air doors 270a, 270b, 270c and 270d are preferably slidable doors which can be progressively opened and shut for admitting air to the bottom portion of the air separator 260.

As a result of the suction drawn on the suck pipe 276, a vacuum is drawn on the air box separator 260 so that a flow of air is drawn from the plenum chamber 234 and across the fingers 230 so that the cotton picked from the module 15 and delivered to the plenum chamber 234 will be tossed about and fluffed in the plenum chamber 234. This cotton eventually falls downwardly and is drawn by the vacuum and also fed positively by the auger 250 transversely across bed 26 and into the air box separator 260. In the air box separator 260, the heavy materials, such as rocks, will fall down the inclined chute of panel 272 and accumulate in the bottom portion of the air box separator 260. By opening the front doors 270a and 270c, ambient air will be drawn into the air box separator 260 and pass beneath the baffle 291, thereby assuring that so long as a vacuum is drawn on the air box separator 260, the baffle 291 will swing inwardly to a position so that the switch 292 will permit the motors to operate. When, however, the vacuum is no longer drawn, thereby indicating that the suck pipe 276 has been stopped up, or the gin stopped, the baffle will return to its initial position, thereby shutting down the motors M1, M2, and M3 and the auger motor (not shown).

Furthermore, since the baffle 291, by manipulation of the doors 270a, 270b, 270c and 270d, an appropriate air differential between the air passing through the front doors 270a and 270c and the air passing through the rear doors 270b and 270d, will regulate the amount of vacuum which is to be drawn on the plenum chamber 234.

After the cart 23 has been propelled sufficiently for the entire module 15 carried thereby to be consumed by the feeder head 225, and this cotton has been propelled sidewise by the auger 250 into the air box separator 260 and thence through the suck pipe 276, the tube 295 will detect the lack of a vacuum and thereby indicate that the module IS has been completely consumed and that a subsequent module 15 carried by a subsequent cart 23 is about to be processed. This will provide a signal for a counter for the modules 15 and also enable the operator to be signaled that perhaps another owner's cotton is to be processed.

When the empty cart 23 has passed through the feeder head section 90, its tongue 22 is available to be picked up by the tractor 27 and returned to the transfer station 10 for receiving another module 15.

By the system of the present invention, modules 15 can be fed successively into the feeder head section 90 and thence the cotton, in a fluffed and cleaned condition, can be delivered to the gin. Since this procedure is automated to a very large extent, very few workman are necessary in order to maintain a proper supply of modules 15 for the feeder head section 90.

It will be obvious to those skilled in the art that many variations may be made in the embodiments here chosen for the purposes of illustrating the present invention, without departing from the scope thereof as defined by the appended claims.

I claim:

1. Apparatus for delivering cotton from a cotton module, having a side and an end, to a gin comprising:

(a) an essentially flat elongated horizontally disposed platform for receiving and supporting a cotton module containing compressed cotton resting on its side in a stationary position on said platform;

(b) wheels depending from said platform for supporting and transporting said platform in its essentially horizontal position from place to place while carrying therewith said cotton module;

(c) means for moving said platform along a prescribed linear path;

(d) a feeder head disposed in a fixed position above said prescribed path and in the path of travel of said module for permitting said platform to be moved progressively beneath said feeder head while carrying said module, said feeder head having a back side and an opposite front side, said front side facing said module on said platform for engaging the end of said module for progressively removing clumps of cotton from said module as said platform carrying the module is progressively moved beneath said feeder head; and for delivering the removed clumps of cotton to a back side of said feeder head;

(e) a conduit on the back side of said feeder head for progressively conveying the clumps of cotton removed from said module away from the back side of said feeder head; and (f) guide means for guiding said platform and its wheels as said platform is moved beneath said feeder head.

2. The apparatus defined in claim 1 wherein said conduit includes a hood enclosing a portion of the area on the back side of said feeder head for former a plenum chamber and a conveyor means for receiving the cotton from said hood, said platform being movable along said linear path for temporarily forming the sole bottom portion of said plenum chamber.

3. The apparatus defined in claim 1 including a driveway passing along said prescribed path and beneath said feeder head, and wheels for supporting said deck in said horizontal position on said driveway, said driveway passing from a position on one side of said feeder head to a position on the other side of said feeder head.

4. The apparatus defined in claim 1 wherein said means for moving said deck includes a conveyor for moving decks conveying modules successively in tandem toward said feeder head whereby the front most of said deck engages and urges said deck beneath said feeder head for being removed therefrom after the cotton of the module carried by said deck is removed by said head.

5. The apparatus defined in claim 1 wherein said conduit includes a rotatable auger conveyor above and extending transversely across the path of travel of said platform and behind said feeder head for engaging and conveying said clumps of cotton removed by said feeder head and which clumps of cotton are received on said platform behind said feeder head, said auger moving said sidewise of the path of said platform as said platform is moved along its path of travel, and an air box through which air is drawn for swirling said cotton clumps for separating said cotton clumps from heavier material entrained in said cotton clumps.

6. The apparatus defined in claim 1 wherein said feeder head includes a plurality of rotatable drums respectively disposed along vertically spaced horizontal axes, circumferentially and axially spaced fingers protruding radially from said drums, and means for simultaneously rotating said drums so that the fingers of said drums penetrate said cotton module.

7. The apparatus defined in claim 6 including radially extending plates protruding radially from said drums for limiting the penetration of said fingers into said cotton module and for providing support for said fingers intermediate the ends of said fingers.

8. The apparatus defined in claim 1 including a housing over the back side of said feeder head, an air box separator adjacent to one side of said housing, a suck tube connected to said air box and a conveyor for moving said clumps of cotton from said housing into said air box separator, whereby heavy material is separated in said air box from said cotton, said air box including adjustment means for controlling the vacuum within said air box; a control for detecting when the flow of air to said suck tube drops and means actuated by said control for interrupting the feed of said clumps of cotton to said air box.

9. The apparatus defined in claim 8 herein said adjustment means comprises at least one door on said air box, said door regulating the amount of ambient air drawn into said air box.

10. The apparatus defined in claim 8, including a baffle and switch mechanism for detecting a drop in the vacuum within said air box, said switch mechanism being capable of shutting down the operation of said apparatus when it detects that there has been a drop in the vacuum within said air box, caused by clogging of said suck tube dictates such shutdown.

11. The process for separating cotton from a cotton module comprising;

(a) passing a cotton module end first along a prescribed linear path of travel;

(b) disposing a feeder head in a stationary position in said path of travel for engaging said end of said module and for progressively removing cotton therefrom as said module is urged against said feeder head; wherein the improvement comprises:

(c) supporting said module on a cart having a platform and having wheels affixed to the underside of said platform and moving said cart with said module thereon along said linear path and beneath said feeder head;

(d) continuing the movement of said platform along said linear path for thereby urging said module toward said feeder head as said cart is moved progressively along said linear path beneath said feeder head so that feeder head progressively removes clumps of cotton from said module; and (e) moving said platform on its wheels away from said linear path.

12. The process defined in claim 11 including receiving the clumps of cotton from said feeder head in a plenum chamber, delivering said clumps of cotton to an air box adjacent to said feeder head, and entraining and swirling said clumps of cotton in an air flow through said plenum chamber and into said air box for removing heavy material from said cotton clumps.

13. The process defined in claim 12 wherein said platform is progressively moved beneath said feeder head and forms part of said plenum chamber.

14. The process defined in claim 13 including moving a second platform with an unloading deck and a hollow interior therewith and a driveway landing to said hollow interior;

a cart having a flatbed platform and wheels supporting said platform;

means for moving said cart along said driveway into a position within said interior of said housing and partially beneath said unloading deck;

a stop associated with said cart for moving therewith so that when said platform is disposed beneath a portion of said deck and said module is urged in an angling downward direction onto said platform, it will move said cart along said driveway containing a second cotton module in a position following said first platform and continuing the process after the cotton has been removed from said first platform so that the cotton is progressively removed from said second platform.

15. The process defined in claim 14 wherein said second platform pushes said first platform for moving said first platform from beneath said feeder head.

16. The process defined in claim 11 including receiving said clumps of cotton progressively with a chamber behind said feeder head so that said clumps of cotton accumulate at the bottom portion of said chamber on said cart, progressively conveying the accumulated clumps of cotton from the bottom portion of said chamber into an air box located adjacent to one side of said feeder head and applying an air flow to the conveyed accumulated clumps of cotton in said air box for separating heavy material by gravity from the conveyed clumps of cotton, and arresting the feed of clumps of cotton to said air box when the air flow within said air box decreases below a prescribed rate of flow.

17. A system for handling cotton modules which are transported in a truck to the site of a cotton gin comprising a transfer station having a housing with an elevated deck on said housing for receiving said truck, a driveway below said deck and adjacent to said housing, a cart having wheels received on said driveway, said cart being moveable along said driveway from said housing to said cotton gin, means for causing said truck to discharge one of said cotton modules onto said platform when said truck is on said platform and for causing said cart to receive said module end first on said platform, and means at said gin for opening said one of said cotton modules, including a conveyor having a second driveway, for receiving said cart and a feeder head for removing said module from the platform of said cart.

18. The system defined in claim 17 wherein said cart includes a tongue connected to certain of said wheels on said cart for steering said cart, said tongue having a guide means, and said driveway being provided with a linear trough along a portion of its length for steering said cart.

19. The system defined in claim 17 wherein said second driveway is provided with a linear trough and said cart includes a tongue for steering said cart, said tongue having a guide means for being received in said trough.

20. An apparatus for delivering cotton modules and cotton clumps therefrom to a cotton gin, comprising:

(a) a plurality of carts of the same prescribed heights, each having a platform and wheels secured to said platform for supporting said platform in a generally horizontal position in which said carts respectively receive and support and transport cotton modules on said platform:

(b) guide means for guiding said carts carrying said modules along a prescribed path;

(c) a feeder head over said prescribed path, said feeder head having a lower portion disposed at a prescribed height greater than the height of said carts in said prescribed path for engaging one end of successive modules as said carts are successively propelled beneath said feeder head, said feeder head producing clumps of cotton from each of said modules;

(d) a conveyor for engaging each of said carts successively for urging said carts successively along said prescribed path toward said feeder head so that successive of said modules on successive of said carts are engaged by said feeder head and reduced to clumps of cotton by said feeder head as said carts are successively urged along said prescribed path beneath and then beyond said feeder head;

(e) means for urging said carts away from said feeder head; and (f) means for engaging said urged carts for moving said carts from said prescribed path and for thereafter receiving and transporting additional modules on said carts to said conveyor.

21. The apparatus of claim 20 including means for collecting said clumps of cotton and for urging the same toward a cotton gin.

22. The apparatus defined in claim 21 including a switch for controlling said conveyor and means connected to said switch for detecting when said clumps of cotton are urged toward said cotton gin.

23. The apparatus defined in claim 22 wherein said guide means contacts the side portions of said carts for lifting and holding said carts at a proper height as said carts are urged beneath said feeder head.

24. The apparatus defined in claim 23 wherein said guide means are spaced parallel rails on which the said opposed side portions are supported.

25. The apparatus in claim 23 including an air box for removing heavy material from said lumps of cotton.

26. Apparatus for delivering cotton modules and cotton therefrom into a cotton gin comprising:

(a) a cart having a platform and a plurality of wheels below said platform for carrying said platform and for supporting said platform in a generally horizontal position movement along a path of travel, said platform having opposed parallel side portions and a generally flat upper surface for removably supporting said module thereon;

(b) a transfer station adjacent to said path of travel, said station having a deck above the surface of said platform, said module being deliverable from said deck onto the upper surface of said platform;

(c) a conveyor having an infeed end and a discharge end;

(d) a roadway over one portion of which said cart, with said module thereon, is moved toward said infeed end of said conveyor and over another portion of which said cart, without said module, is moved away from said conveyor and toward said transtar station for receiving a subsequent module;

(e) said conveyor being adapted for receiving said cart in it infeed end and for conveying said cart toward said discharge end while its platform carries said module along a prescribed linear path toward said discharge end;

(f) a feeder head disposed adjacent to said conveyor for engaging said module and for progressively removing clumps of cotton from said module while said module is carried by said platform of said cart toward said discharge end;

(g) a housing having a chamber defined in part by said feeder head for receiving said clumps of cotton;

(h) means for directing said clumps of cotton toward said gin; and (i) said cart being movable on said wheels away from the discharge end of said conveyor for being returned to said transportation station.

27. An apparatus for handling cotton modules wherein a feeder head reduces modules successively to clumps of cotton and such clumps are fed by a conveyor toward the suction end of a suck pipe and thence along said suck pipe to a gin, the improvement comprising:

a substantially closed air box connected between said conveyor and said suck pipe, said suck pipe being coupled to said air box and being located to cause a swirling of air within said air box so that said clumps of cotton are swirled by the air passing from said air box into said suck pipe for releasing heavy material from said clumps of cotton within said air box prior to said clumps entering said suck pipe.

28. The apparatus defined in claim 27 including an air actuated switch connected to said air box and in the path of said flow of air for being actuated when said flow of air into said suck pipe is reduced from a prescribed rate of flow and control means for precluding the feeding of modules to said feeder head until the prescribed rate of flow of said air is restored.

29. The apparatus defined in claim 28 including an opening in said air box for admitting ambient air to said air box and an adjustable door for regulating the effective size of said opening.

* * * * *